(12) United States Patent
Kim

(10) Patent No.: US 9,167,621 B2
(45) Date of Patent: Oct. 20, 2015

(54) COMMUNICATION DEVICE WITH PHASE/ANGLE TRANSFORMATION AND METHODS FOR USE THEREWITH

(71) Applicant: BROADCOM CORPORATION, Irvine, CA (US)

(72) Inventor: Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 215 days.

(21) Appl. No.: 13/875,907

(22) Filed: May 2, 2013

(65) Prior Publication Data
US 2014/0010153 A1 Jan. 9, 2014

Related U.S. Application Data

(60) Provisional application No. 61/669,621, filed on Jul. 9, 2012, provisional application No. 61/811,916, filed on Apr. 15, 2013.

(51) Int. Cl.
H04W 88/06 (2009.01)
H04W 48/18 (2009.01)

(52) U.S. Cl.
CPC .............. *H04W 88/06* (2013.01); *H04W 48/18* (2013.01)

(58) Field of Classification Search
CPC ... H04W 88/06; H04L 1/0618; H04L 1/0606; H04L 1/06; H04L 1/0668
See application file for complete search history.

(56) References Cited

U.S. PATENT DOCUMENTS

| 7,065,149 | B2 * | 6/2006 | Ghavami et al. | 375/267 |
|---|---|---|---|---|
| 7,782,822 | B2 * | 8/2010 | Xhafa et al. | 370/336 |
| 7,995,457 | B2 * | 8/2011 | Kim | 370/208 |
| 8,526,345 | B2 * | 9/2013 | Rofougaran | 370/310.2 |
| 2006/0176993 | A1 * | 8/2006 | Kwun et al. | 375/367 |
| 2006/0239375 | A1 * | 10/2006 | Kim et al. | 375/267 |
| 2009/0213955 | A1 * | 8/2009 | Higuchi et al. | 375/267 |
| 2010/0165967 | A1 * | 7/2010 | Kim | 370/338 |
| 2011/0158362 | A1 * | 6/2011 | Kim et al. | 375/347 |
| 2012/0250743 | A1 * | 10/2012 | Heath et al. | 375/219 |

OTHER PUBLICATIONS

Lin et al, A New Transmit Scheme Combining Beamformingwith Space-Time Block Coding, 2008, IEEE Communications Society subject matter experts for publication in the ICC 2008 proceedings, pp. 3961-3965.*
Joonsuk Kim, Interference Suppression for High Data Rate STBC/SFBC with 1-bit Feedback, 2009 IEEE, pp. 13-15.*
Kim et al, Closed-loop Space Time Block Coding for High Data Rate with Angle Feedback, IEEE, 2011, 5 pages.*

* cited by examiner

*Primary Examiner* — Ahmed Elallam
(74) *Attorney, Agent, or Firm* — Garlick & Markison; Bruce E. Stuckman

(57) ABSTRACT

A communication device includes antennas to receive a first signal from a remote device, wherein the first signal corresponds to a first operational mode. A baseband processor selects either a first operational mode for transmitting a second signal or a second operational mode for transmitting the second signal. When the second operational mode is selected the baseband processor transforms the phase-related information corresponding to the first operational mode to transformed phase-related information corresponding to the second operational mode. The antennas transmit the second signal to the remote device in accordance with the transformed phase-related information corresponding to the second operational mode.

20 Claims, 10 Drawing Sheets

COMMUNICATION DEVICE WITH PHASE/ANGLE TRANSFORMATION AND METHODS FOR USE THEREWITH

CROSS REFERENCE TO RELATED APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/669,621, entitled ADAPTIVE PHASE-RELATED INFORMATION AND BEAMFORMING WITHIN SINGLE USER MULTIPLE USER, MULTIPLE ACCESS, AND/OR MIMO WIRELESS COMMUNICATIONS, filed Jul. 9, 2012; and
2. U.S. Provisional Application Ser. No. 61/811,916, entitled COMMUNICATION DEVICE WITH PHASE TRANSFORMATION AND METHODS FOR USE THEREWITH, filed Apr. 15, 2013.

BACKGROUND

1. Technical Field

The invention relates generally to communication systems; and, more particularly, it relates to beamforming, within single user, multiple user, multiple access, and/or MIMO wireless communications.

2. Description Of Related Art

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

With the proliferation of high throughput application, high data rates have become an important issue for modern communication devices. The fidelity of communications, however, face the scrutiny of users that are becoming accustomed to high bandwidth and better communication quality.

DETAILED DESCRIPTION

Figure 1:
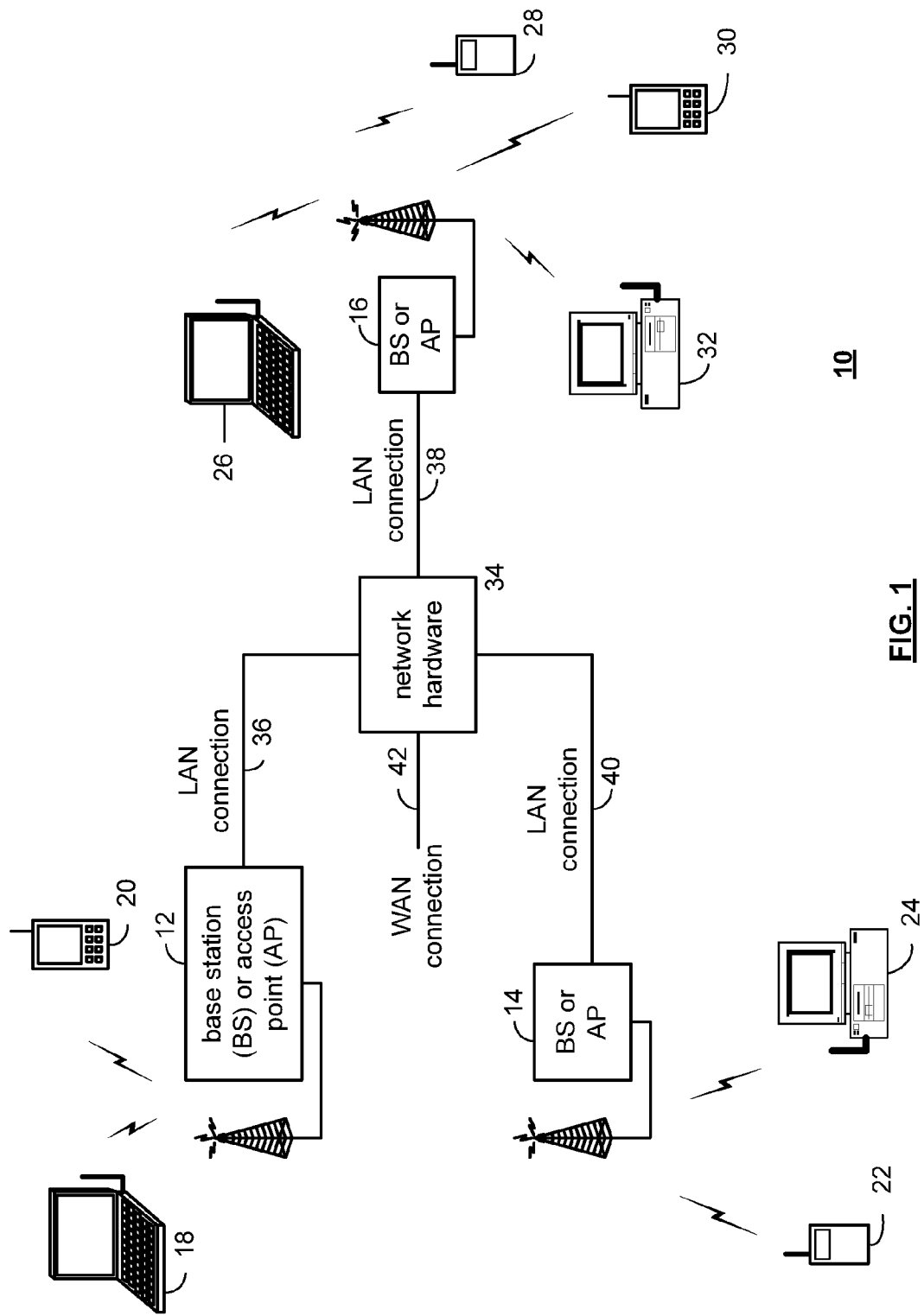
FIG. 1 is a diagram illustrating an embodiment of a wireless communication system.

FIG. 1 is a diagram illustrating an embodiment of a wireless communication system. Wireless communication system 10 includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects as presented herein to enhance performance, reduce costs, reduce size, and/or enhance broadband applications.

Figure 2:
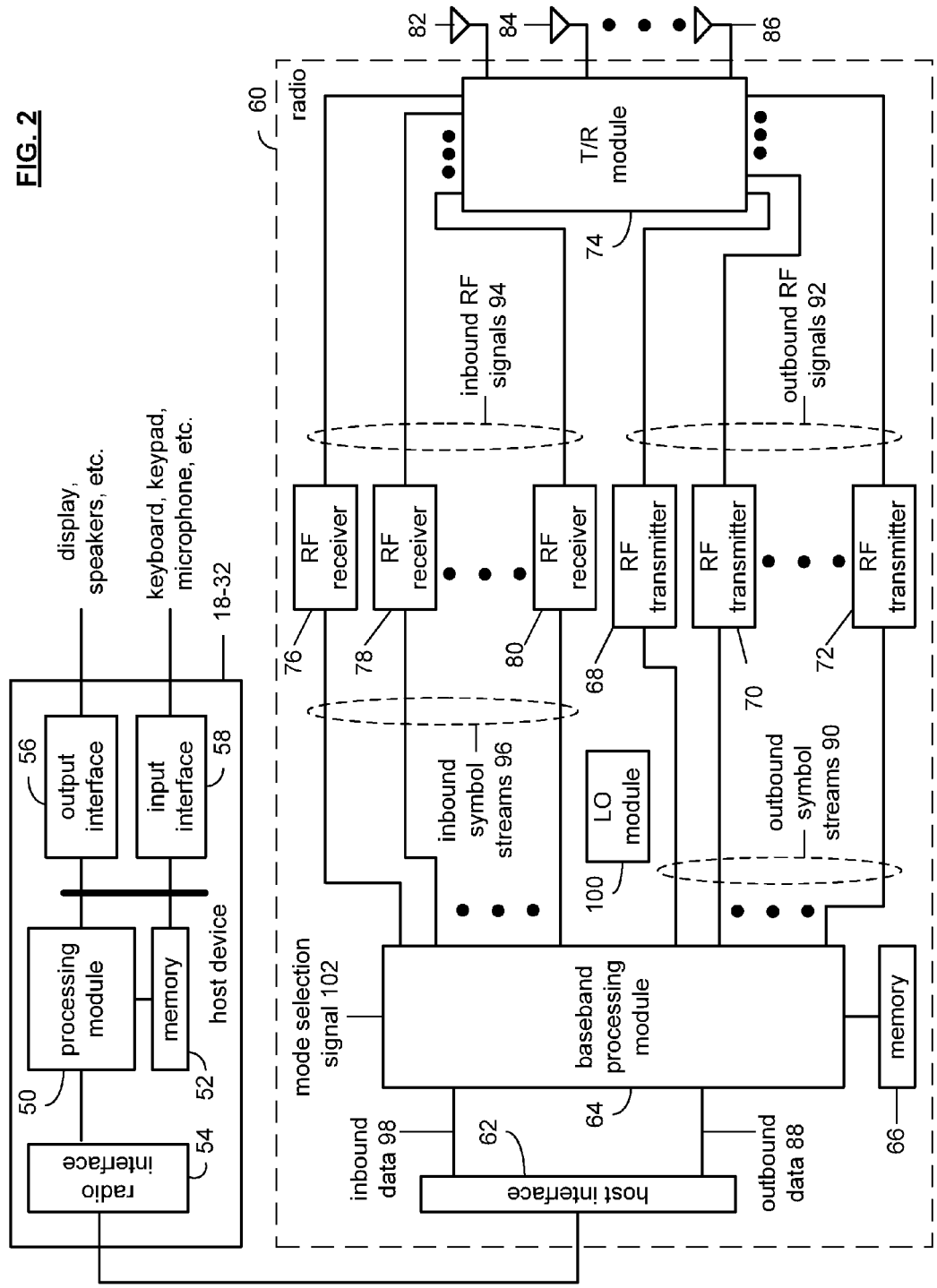
FIG. 2 is a diagram illustrating an embodiment of a wireless communication device.

FIG. 2 is a diagram illustrating an embodiment of a wireless communication device. In particular, a wireless communication device is shown that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennas 82-86, a plurality of RF receivers 76-80, and a local oscillation module 100. The baseband processing module 64, in combination with operational instructions stored in memory 66, execute digital receiver functions and digital transmitter functions, respectively. In operation, the radio 60 receives outbound data 88 from the host device via the host interface 62. The baseband processing module 64 receives the outbound data 88 and, based on a mode selection signal 102, produces one or more outbound symbol streams 90.

The baseband processing module 64, based on the mode selection signal 102 produces the one or more outbound symbol streams 90 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennas, the baseband processing module 64 will produce 2, 3 or 4 outbound symbol streams 90 corresponding to the number of antennas from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennas 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received. The baseband processing module 64 receives the inbound symbol streams 90 and converts them into inbound data 98, which is provided to the host device 18-32 via the host interface 62.

In operation, one or more antennas receive a first signal from a remote device such as an access point or base station, station or client device. The first signal is used to determine phase-related information corresponding to a first operational mode of the device. A baseband processor, such as baseband processing module 64 or other processing module selects either a first operational mode for transmitting a second signal or a second operational mode for transmitting the second signal. When the second operational mode is selected the baseband processor transforms the phase-related information corresponding to the first operational mode to transformed phase-related information corresponding to the second operational mode. The antennas transmit the second signal to the remote device in accordance with the transformed phase-related information corresponding to the second operational mode.

In an embodiment, the first operational mode and the second operation mode are differing ones of: a space-time block coding transmission scheme such as co-phased space time block coding (STBC) and a beamforming transmission scheme such as equal-gain beamforming (EGBF). For example, the first operational mode is a space-time block coding transmission scheme and the second operational mode is a beamforming transmission scheme. Alternatively, the second operational mode is a space-time block coding transmission scheme and the first operational mode is a beamforming transmission scheme. Further, the baseband processor can select either the first operational mode for transmitting the second signal or the second operational mode for transmitting the second signal, based on a measure of staleness of the phase-related information corresponding to the first operational mode. While the two operational modes are described above in conjunction with a space-time block coding transmission scheme and a beamforming transmission scheme, other operational modes that rely on phase-related information can likewise be employed.

In an embodiment, when the first operational mode is selected for transmitting the second signal, the antennas transmit the second signal to the remote device in accordance with the phase-related information corresponding to the first operational mode. It should also be noted that that device can operate to reciprocally transform phase-related information between the two operational modes. In addition to the operation discussed above, the antenna or antennas can receive a third signal from the remote device, wherein the third signal includes phase-related information corresponding to the second operational mode. The baseband processor can select one of: the first operational mode for transmitting a fourth signal and a second operational mode for transmitting the fourth signal. When the first operational mode is selected for transmitting the fourth signal, the baseband processor transforms the phase-related information corresponding to the second operational mode to transformed phase-related information corresponding to the first operational mode. The antenna or antennas transmit the fourth signal to the remote device in accordance with the transformed phase-related information corresponding to the first operational mode.

Further optional functions and features of such a communication device are described in conjunction with FIGS. 3-8 that follow.

Figure 3:
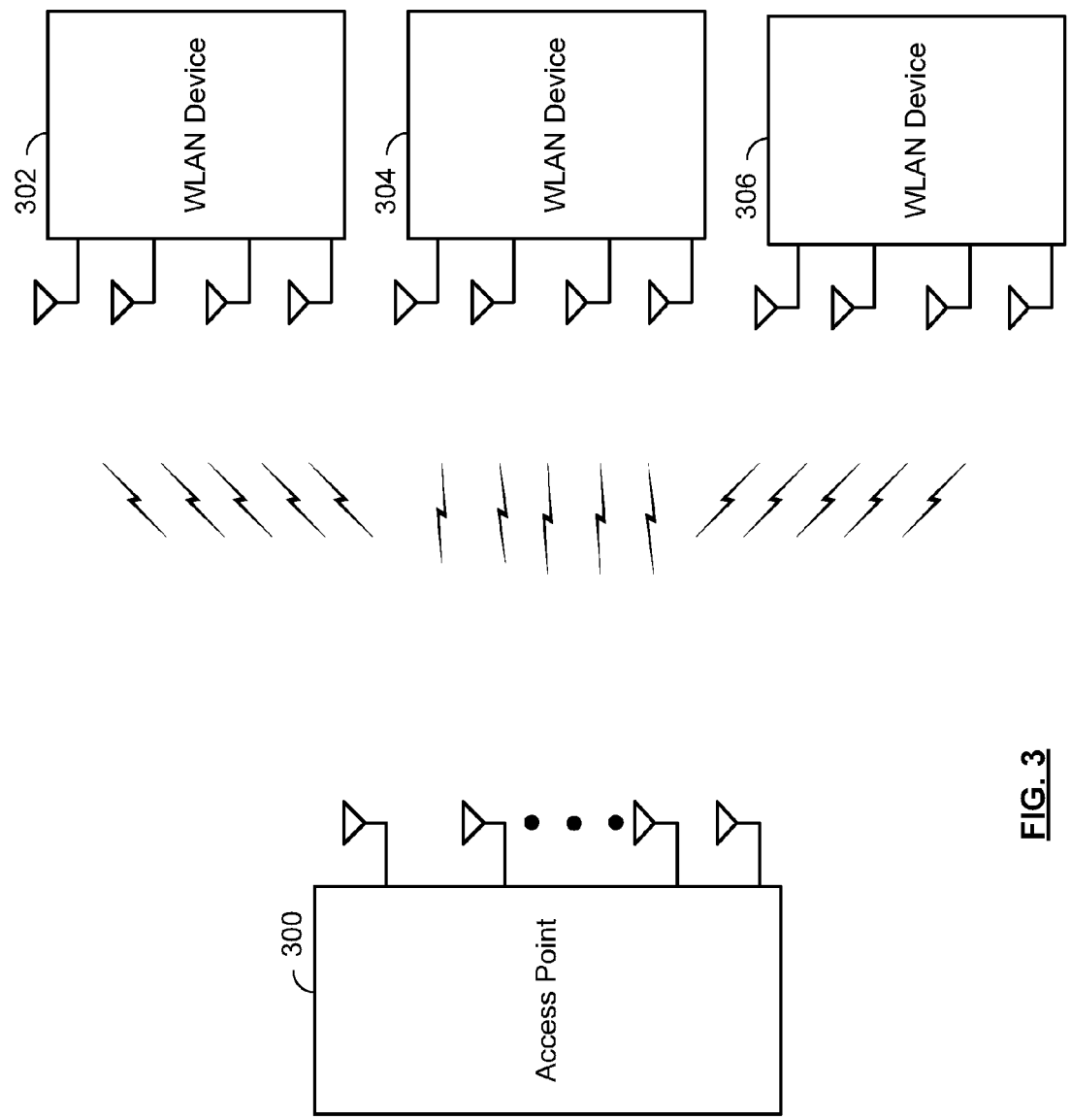
FIG. 3 is a diagram illustrating an embodiment of an access point (AP) and multiple wireless local area network (WLAN) devices operating according to one or more various aspects and/or embodiments.

FIG. 3 is a diagram illustrating an embodiment of an access point (AP) and multiple wireless local area network (WLAN) devices operating according to one or more various aspects and/or embodiments. In particular, the features described in conjunction with radio 60 can be implemented in AP 300 and/or WLAN devices 302, 304 and 306.

The AP 300 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 300 supports communications with the WLAN devices 302, 304, and 306 with channel bandwidths, MIMO dimensions, and at data throughput rates unsupported by the prior IEEE 802.11x operating standards. For example, the access point 300 and WLAN devices 302, 304, and 306 may support channel bandwidths from those of prior version devices and from 40 MHz to 1.28 GHz and above. The access point 300 and WLAN devices 302, 304, and 306 support MIMO dimensions to 4×4 and greater. With these characteristics, the access point 300 and WLAN devices 302, 304, and 306 may support data throughput rates to 1 GHz and above.

The AP 300 supports simultaneous communications with more than one of the WLAN devices 302, 304, and 306. Simultaneous communications may be serviced via OFDM tone allocations (e.g., certain number of OFDM tones in a given cluster), MIMO dimension multiplexing, or via other techniques. With some simultaneous communications, the AP 300 may allocate one or more of the multiple antennas thereof respectively to support communication with each WLAN device 302, 304, and 306, for example.

Further, the AP 300 and WLAN devices 302, 304, and 306 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission (e.g., OFDM may be viewed as being a subset of OFDMA). A single MU-MIMO transmission may include spatially-diverse signals over a common set of tones, each containing distinct information and each transmitted to one or more distinct receivers. Some single transmissions may be a combination of OFDMA and MU-MIMO. Multi-user (MU), as described herein, may be viewed as being multiple users sharing at least one cluster (e.g., at least one channel within at least one band) at a same time.

MIMO transceivers illustrated may include SISO, SIMO, and MISO transceivers. The clusters employed for such communications (e.g., OFDMA communications) may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments. Such a MU-MIMO/OFDMA transmitter (e.g., an AP or a STA) may transmit packets to more than one receiving wireless communication device (e.g., STA) on the same cluster (e.g., at least one channel within at least one band) in a single aggregated packet (such as being time multiplexed). In such an instance, channel training may be required for all communication links to the respective receiving wireless communication devices (e.g., STAs).

Figure 4:
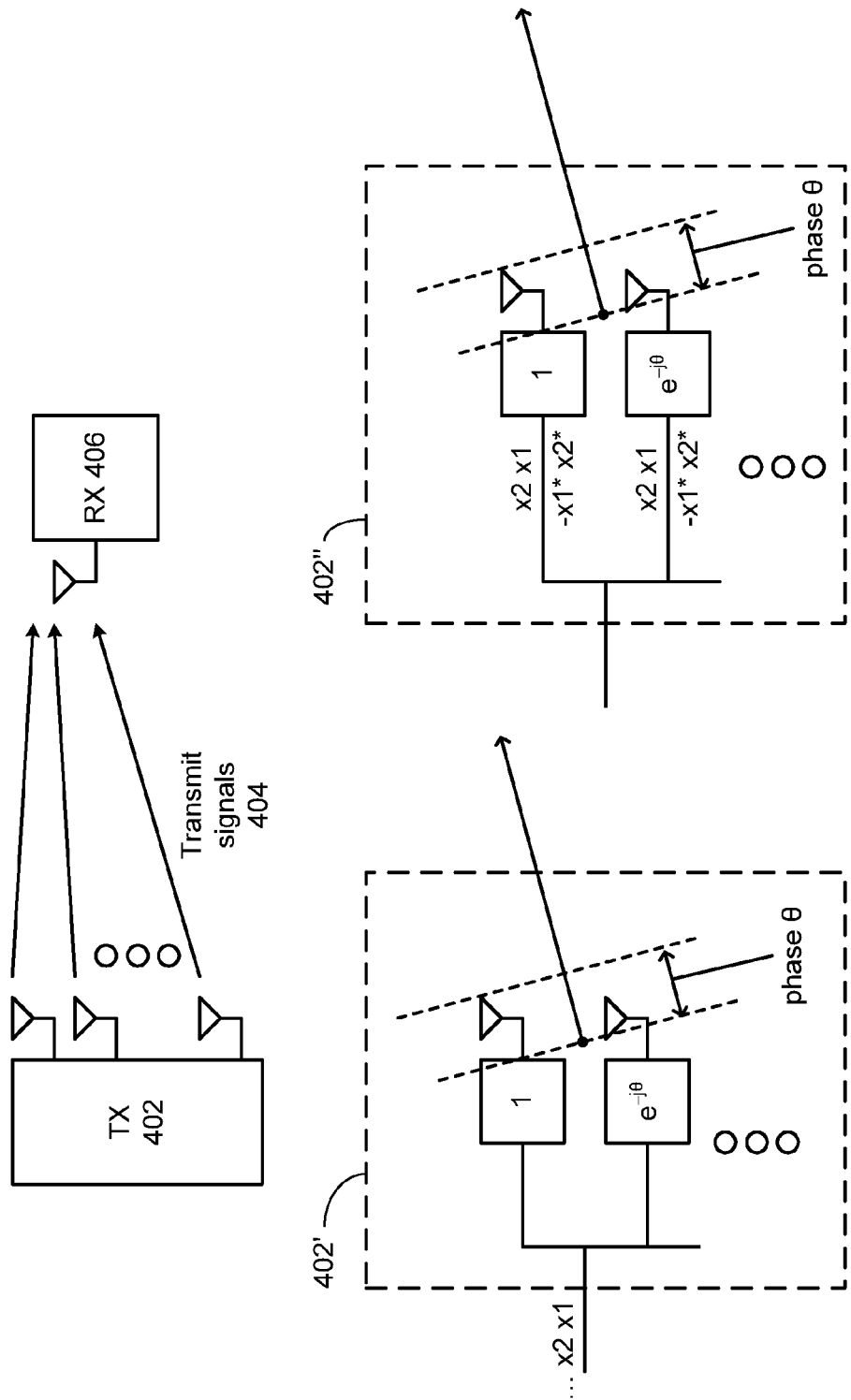
FIG. 4 illustrates an embodiment of operation of a wireless communication device in accordance with equal-gain beamforming (EGBF) and co-phased space time block coding (STBC).

FIG. 4 illustrates an embodiment of operation of a wireless communication device in accordance with equal-gain beamforming (EGBF) and co-phased space time block coding (STBC). A transmitter 402 includes a plurality of antennas that transmit a plurality of transmit signals 404 to a receiver 406. The transmitter and receiver may be any combination of AP and STA, mobile device and base station or other transmit and receive pair.

Considering a particular implementation where the transmitter 402 includes two or more respective operational modes (e.g., EGBF and co-phased STBC), operation may be adaptive in selecting between and among these respective operational modes. Operation of the transmitter 402 in accordance with EGBF is presented in conjunction with 402'. In the particular the transmitter employs compensation of the phase difference ($\theta$) between the first antenna of a multi-antennas implementation in each of the respective other antenna of the multi-antennas implementation. While two antennas are specifically shown, other phase differences are applied to the other antennas. Most generally a phase difference of ($\theta_i$) is applied to the ith antenna.

Operation of the transmitter 402 in accordance with STBC is presented in conjunction with 402". Co-phased STBC compensates the phase difference ($\theta$) with respect to each pair of antennas (e.g., the first and second antennas forming a first pair shown and a third and fourth antennas forming a second pair, etc.). Most generally a phase difference of ($\theta_i$) is applied to the ith pair of antennas.

A discussed in conjunction with FIG. 2, phase-related information such as angle/phase information between at least these two respective operational modes may be reused. For example, when such phase-related information is provided in accordance with one of the respective operational modes, that phase-related information they be converted for use to operate in accordance with at least one other of the respective operational modes. In such situations, regardless of the particular format associated with phase-related information that is provided to a beamformer (e.g., as corresponding to a given operational mode), that information may be converted to any desired type of feedback for operating in accordance with any other desired operational mode. If the phase-related information is provided in accordance with the EGBF operational mode, the phase-related information may be converted for use in accordance with the co-phased STBC operational mode. Alternatively, if the phase-related information is provided in accordance with the co-phased STBC operational mode, the phase-related information may be converted for use in accordance with the EGBF operational mode.

Figure 5:
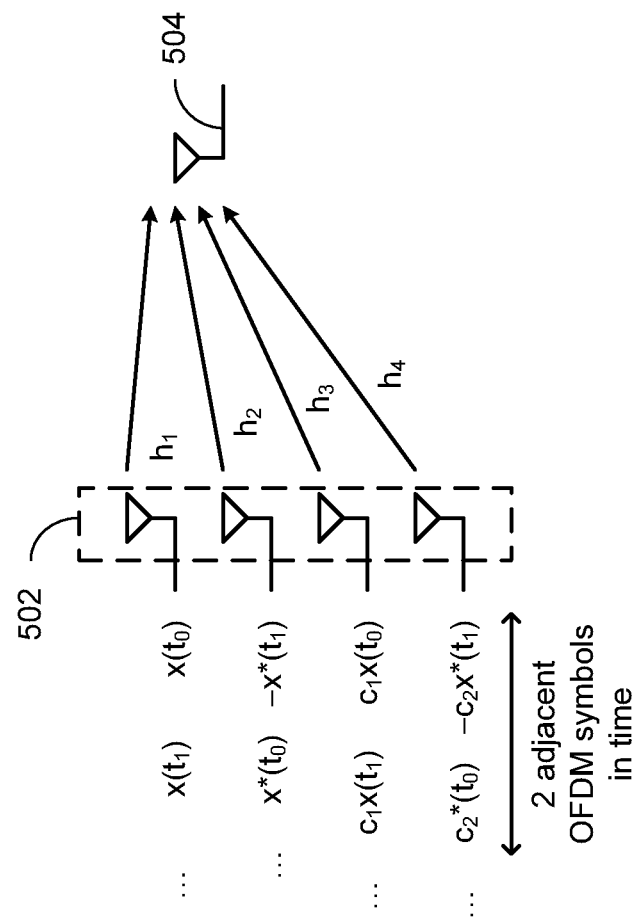
FIG. 5 illustrates an embodiment of co-phased STBC and/or SFBC in accordance with 4×1 signaling.

FIG. 5 illustrates an embodiment of co-phased STBC and/or SFBC in accordance with 4×1 signaling. A pair of time adjacent OFDM symbols of four symbol streams are shown for transmission by a group of four antennas 502. The transmit and receive hardware are not specifically shown. The channel between each antenna and the receive antenna 504 is represented by ($h_1$, $h_2$, $h_3$, $h_4$). As has been discussed, rotation may be performed with respect to different antennas within different respective Alamouti pairs may be performed. As may be seen with respect to this diagram, different respective rotation may be made with respect to the different individual antennas within a given Alamouti pair. That is to say, considering and Alamouti pair corresponding to two respective antennas, the signaling provided to each respective antenna within that particular Alamouti pair may in fact undergo a different respective rotation. For example, as may be seen with respect to this diagram that operates in accordance with 4×1 signaling, the antennas 3 and 4 may be operative to transmit the same Alamouti pairs with rotation (repeated over space). The second Alamouti pair may be viewed as being rotated to be phase aligned with the first Alamouti pair (e.g., from certain perspectives, and implementation of being formed STBC and/or SFBC).

Assuming that $h_i(t_0) = h_i(t_1)$ for i=1, 2, 3, 4, the receiver at antenna 504 receives the following:

$$\begin{bmatrix} y(t_0) \\ y^*(t_1) \end{bmatrix} = \begin{bmatrix} h_1 + c_1 h_3 & -h_2 - c_2 h_4 \\ h_2^* + c_2^* h_4^* & h_1^* + c_1^* h_3^* \end{bmatrix} \begin{bmatrix} x(t_0) \\ x^*(t_1) \end{bmatrix} + \begin{bmatrix} n_0 \\ n_1 \end{bmatrix}$$

$$= H \times \begin{bmatrix} x(t_0) \\ x^*(t_1) \end{bmatrix} + \begin{bmatrix} n_0 \\ n_1 \end{bmatrix}$$

Generally speaking, while certain of the embodiments and/or diagrams illustrated herein may be viewed as being described with respect to STBC, the principles described herein may also be extended to SFBC (e.g., such as being applied to adjacent sub-carriers of an OFDM system) and/or a combination of STBC and SFBC (e.g., such as in accordance with hybrid ST/FBC described above or some other implemented combination of STBC and SFBC).

For example, considering transmission of long training field (LTF) within a packet, two respective LTF's may be sent (e.g., a first LTF through antennas 1 and 3 and a second LTF through antennas 2 and 4). The communication channels are then measured as $h_1 + c_1 h_3$ and $h_2 + c_2 h_4$ based on feedback from the receiver (e.g., which would be transparent with respect to a receiver communication device). For example, such processing may be performed completely in accordance with baseband processing, such that no hardware modification need necessarily be required within such operative and implemented communication devices. For example, such a transmitter communication device may actually use 4 respective transmit antennas (e.g., in accordance with 4 Tx), but the packet will appear to be 2 Tx Alamouti from the perspective of the receiver communication device. The receiver may be implemented to operate using Alamouti pair decoding (e.g., such as in accordance with IEEE 802.11n and/or 802.11ac), such that no hardware modifications are required.

Generally speaking, as may be understood with respect to this diagram and or others employing co-phased STBC and/or SFBC, different respective rotational values may be separately employed with respect to each of the respective antennas associated with an Alamouti pair. That is to say, rather than using a singular phase rotation or value in accordance with one or more Alamouti pairs associated with a given mode of transmission, more than one phase rotation or value may be respectively employed for the different respective signals transmitted via different respective antennas within one or more Alamouti pairs.

Considering the example above for co-phase 4×1 STBC and/or SFBC, appropriately selected values for rotation may be made to maximize the diagonal terms associated with equation 1 below.

$$H_{sq} = H^* H = \begin{bmatrix} \Sigma & 0 \\ 0 & \Sigma \end{bmatrix} \quad (1)$$

$$\Sigma = |h_1 + c_1 h_3|^2 + |h_2 + c_2 h_4|^2$$

$$= \sum_i |h_i|^2 + [(c_1 h_1^* h_3 + c_1^* h_1 h_3^*) + (c_2 h_2^* h_4 + c_2^* h_2 h_4^*)]$$

$$= \sum_i |h_i|^2 + 2\Re(c_1 \alpha) + 2\Re(c_2 \beta)$$

where $\alpha = h_1^* h_3$, $\beta = h_2^* h_4$, and $\Re$ denotes "real part"

To maximize the diagonal terms, choose
$c_1 = \exp(j\theta_1), c_2 = \exp(j\theta_2)$
with the angles
$\theta_1 = \text{angle}(\alpha), \theta_2 = \text{angle}(\beta)$ Again, as may be understood with respect to certain embodiments and/or diagrams herein, more than one phase rotation or value may be respectively employed for the different respective signals transmitted via different respective antennas within one or more Alamouti pairs. As such, different respective of values may be used for respectively rotating different signal portions associated with different antennas of one or more Alamouti pairs.

With respect to feedback provided from a receiver communication device to a transmitter communication device, the relatively simplest feedback may be composed of 2 bits (e.g., each respective $c_i$ having feedback associated with 1 of the respective bits). For example, if the real portion associated with one of the respective values, $\alpha$ or $\beta$, is greater than zero, then the feedback bit associated with that value may be set to 1; otherwise, the feedback bit associated with that value may be set to −1.

Generally speaking, the different respective values, $\alpha$ or $\beta$, may be separated out to allow for more effective fine-tuning of the real portion of signaling transmitted via the respective antennas. That is to say, as a function of the inner product of the H matrix, individual and respective rotation of the elements may be performed therein. As such, increased gain may be achieved by individually and selectively rotating the different respective signal portions transmitted via different respective antennas, such as within one or more Alamouti pairs.

Figure 6:
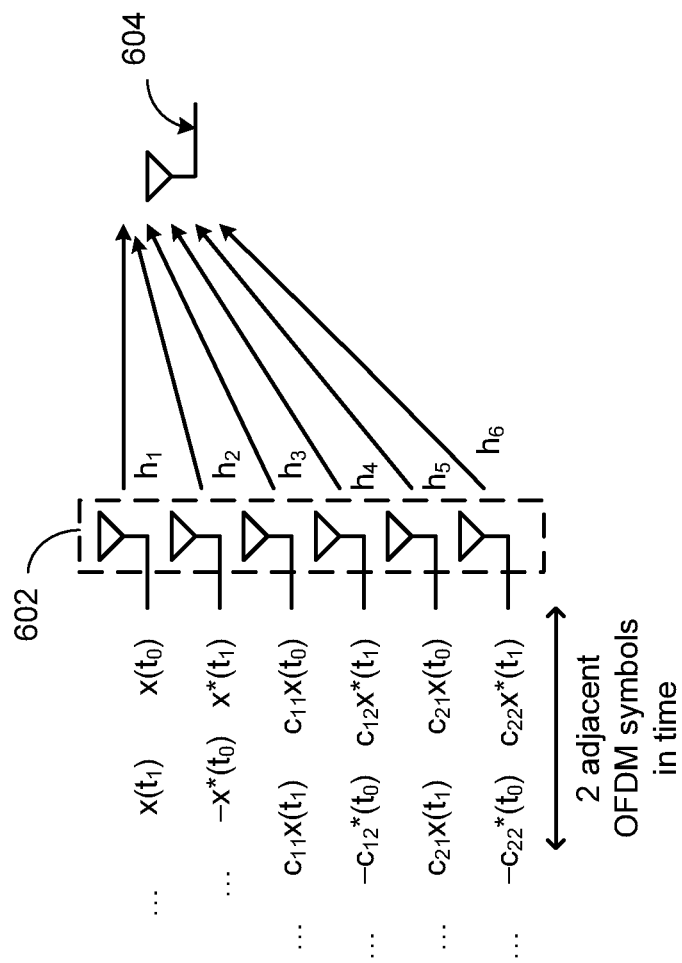
FIG. 6 illustrates an embodiment of co-phased STBC and/or SFBC in accordance with 6×1 signaling.

FIG. 6 illustrates an embodiment of co-phased STBC and/or SFBC in accordance with 6×1 signaling. As may be seen with respect to this diagram which includes more transmit antennas within a transmitter communication device than that included within the prior 4×1 embodiment, there are two additional Alamouti pairs that are transmitted. A pair of two time adjacent OFDM symbols of six symbol streams are shown for transmission by a group of six antennas 602. The transmit and receive hardware are not specifically shown. The channel between each antenna and the receive antenna 604 is represented by ($h_1$, $h_2$, $h_3$, $h_4$, $h_5$, $h_6$). As such, to effectuate differentiation between respective Alamouti pairs, a double valued subscript is employed for the phase rotations respectively provided via the use additional Alamouti pairs. Generally speaking, for a given rotation value, $c_{i,j}$, the value of i corresponds to the additional Alamouti pair index, and the value of j corresponds to the particular antenna (e.g., even or odd antenna) within a given Alamouti pair. For example, the value of $c_{1,1}$ corresponds to the first Alamouti pair index and the first antenna within that particular Alamouti pair, while the value of $c_{1,2}$ corresponds also to that first Alamouti pair index but instead corresponds to the second antennas within a particular Alamouti pair.

Assuming that $h_i(t_0) = h_i(t_1)$ for i=1, 2, 3, 4, 5, 6, the receiver at antenna 1804 receives the following:

$$\begin{bmatrix} y(t_0) \\ y^*(t_1) \end{bmatrix} = \begin{bmatrix} h_1 + c_{11}h_3 + c_{21}h_5 & h_2 + c_{12}h_4 + c_{22}h_6 \\ -h_2^* - c_{12}^*h_4^* - c_{22}^*h_6^* & h_1^* + c_{11}^*h_3^* + c_{21}^*h_5^* \end{bmatrix} \begin{bmatrix} x(t_0) \\ x^*(t_1) \end{bmatrix} + \begin{bmatrix} n_0 \\ n_1 \end{bmatrix}$$

$$= H \times \begin{bmatrix} x(t_0) \\ x^*(t_1) \end{bmatrix} + \begin{bmatrix} n_0 \\ n_1 \end{bmatrix}$$

As may be seen with respect to this diagram that includes 6 respective transmit antennas and operate in accordance with 6×1 signaling, there are three respective variables, α, β, and γ. As such, there are eight respective choices respect to this embodiment 1800. Clearly, if more respective transmit antennas are employed, then the number of variables will increase correspondingly.

Figure 7:
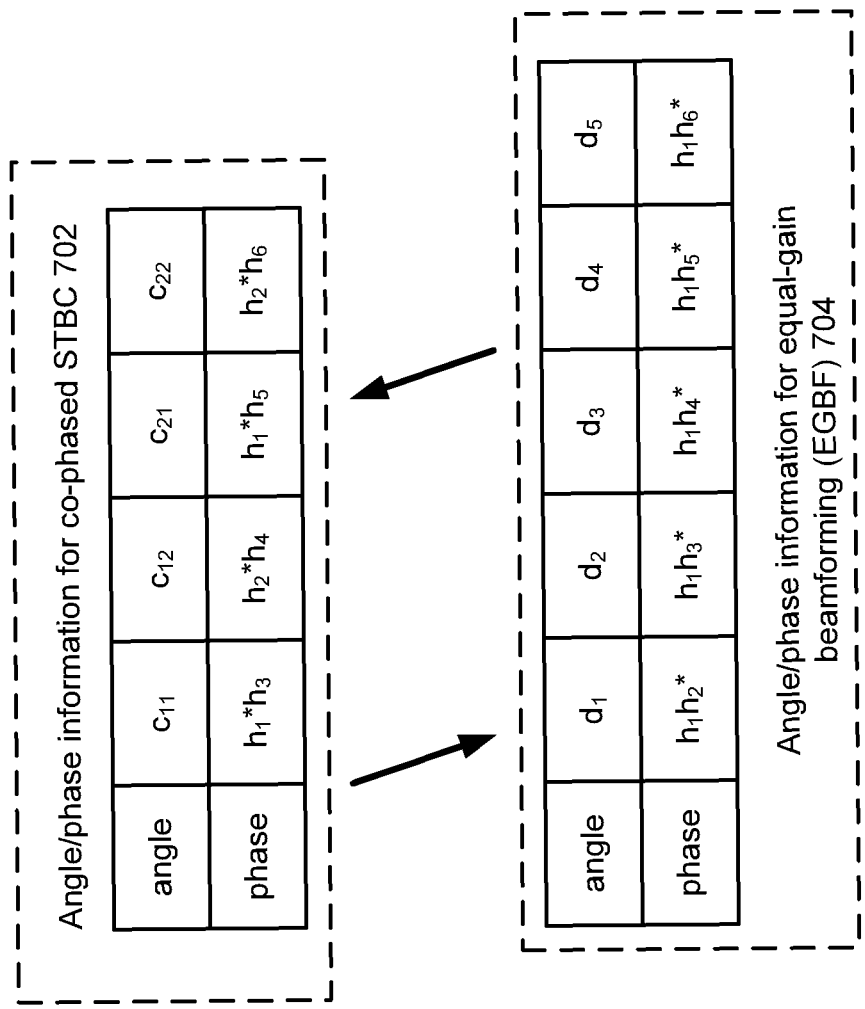
FIG. 7 illustrates an embodiment of phase/angle information in accordance with equal-gain EGBF and co-phased STBC.

When operating to maximize the diagonal terms associated with equation 1 after undergoing modification with the increased number of antennas, then the summation term within the equation 1 is modified to correspond to the equation 2 below.

$$\Sigma = \sum_i |h_i|^2 + 2\sum_{j=1}^2 (\Re(c_{1j}\alpha_j) + \Re(c_{2j}\beta_j) + \Re(c_{1j}^* c_{2j}\gamma_j)) \quad (2)$$

where $\alpha_j = h_j^* h_{j+2}$, $\beta_j = h_j^* h_{j+4}$, $\gamma_j = h_{j+2}^* h_{j+4}$ FIG. 7 illustrates an embodiment of phase related information in accordance with equal-gain EGBF and co-phased STBC. A 6×1 configuration is shown. As may be seen with respect to this diagram, the angle/phase information for co-phased STBC 702 includes a phase rotation, $c_{i,j}$, that is found to match the phase difference between the phase difference between $(2i+j)^{th}$ transmit antenna and the $j^{th}$ transmit antenna, where i=1, 2, . . . (Nt/2−1), j=1, 2 (index of antenna within Alamouti pair). For the 6×1 example,

| | angle | | | |
|---|---|---|---|---|
| | $c_{11}$ | $c_{12}$ | $c_{21}$ | $c_{22}$ |
| phase | $h_1^* h_3$ | $h_2^* h_4$ | $h_1^* h_5$ | $h_2^* h_6$ |

Also, the angle/phase information for EGBF 704 includes a phase rotation $d_k$ that is found to match the phase difference between $(k-1)^{th}$ transmit antenna with the $1^{st}$ transmit antenna, where k=1, 2, . . . (Nt−1). Within this diagram, as well as others, it is noted that the symbol '*' denotes complex conjugate. Considering again the 6×1 example,

| | angle | | | | |
|---|---|---|---|---|---|
| | $d_1$ | $d_2$ | $d_3$ | $d_4$ | $d_5$ |
| phase | $h_1 h_2^*$ | $h_1 h_3^*$ | $h_1 h_4^*$ | $h_1 h_5^*$ | $h_1 h_6^*$ |

Phase/angle information between the two respective schemes may be reused. That is to say, regardless of which of the two respective operational modes the information corresponds, the information may be transformed to the other of the two respective operational modes. It should be noted that, given the mathematical equivalence between phase and angle information, either can be used or re-used by a transmitter. The terms angle, phase, and angle/phase are interchangeable in this regard. Examples of such transformations are presented in conjunction with the examples that follow.

When the values of $d_k$ derived from EGBF are available, then the corresponding information for co-phased STBC may be determined therefrom based on the equations below.

| | |
|---|---|
| $c_{i1} =$ | $d_{2i}^*$ |
| $c_{i2} =$ | $d_1 d_{(2i+1)}^*$ |

Considering the 6×1 example discussed above:

| | |
|---|---|
| $c_{11} =$ | $d_2^*$ |
| $c_{12} =$ | $d_1 d_3^*$ |
| $c_{21} =$ | $d_4^*$ |
| $c_{22} =$ | $d_1 d_5^*$ |

Similarly, when information corresponding to co-phased STBC is available, then the corresponding information for EGBF may be determined therefrom based on the equations below.

| | |
|---|---|
| $d_1$ | use add'l information for $d_1$ |
| $d_{2k} =$ | $c_{k1}^*$ |
| $d_{(2k+1)} =$ | $d_1 c_{k2}^*$ |

With respect to conversion from information provided in accordance with co-phased STBC (e.g., $c_{i,j}$) to information for use in accordance with EGBF, it is noted that information associated with $d_1$ (the difference in phase between the first two antennas) is needed. As such, when performing the conversion from co-phased STBC to EGBF, the additional information associated with $d_1$ should be accounted for gathering this additional information, directly or indirectly, or otherwise assigning this value, etc.

Considering the 6×1 example discussed above:

| | |
|---|---|
| $d_1$ | use add'l information for $d_1$ |
| $d_2 =$ | $c_{11}^*$ |
| $d_3 =$ | $d_1 c_{12}^*$ |
| $d_4 =$ | $c_{21}^*$ |
| $d_5 =$ | $d_1 c_{22}^*$ |

While specific examples have been described, it should be noted that, more generally, phase-related feedback from a remote receiver in association with one mode of transmission, or phase-related information generated based on a phase codebook, channel estimation, channel estimation codebook or other channel related feedback from a remote receiver in association with one mode of transmission, can be used by a transmitter to derive phase information that is used to transmit signals in another mode of transmission.

Figure 8:
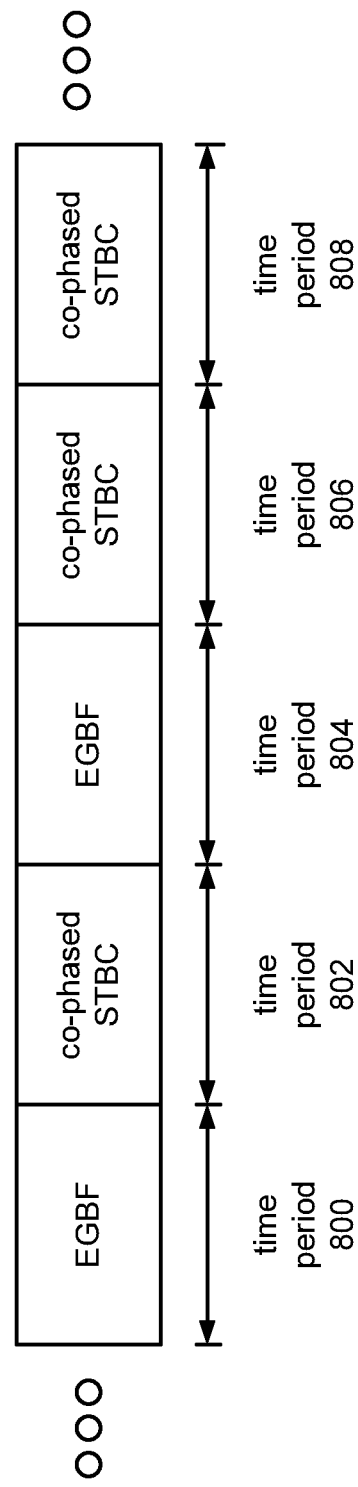
FIG. 8 illustrates an embodiment of adaptation between operational modes (e.g., between equal-gain EGBF and co-phased STBC).

FIG. 8 illustrates an embodiment of adaptation between operational modes (e.g., between equal-gain EGBF and co-phased STBC). In particular a timing diagram is shown that presents the switching between EGBF and co-phased STBC at time intervals 800, 802, 804, 806 and 808. While described in conjunction with EGBF and co-phased STBC, more generally, operation between any two or more operational modes may be made by reusing phase information associated with at least one of those respective operational modes and converting it for use in operation with one or more other of those respective operational modes. While certain embodiments presented herein relate to devices operating using two respective operational modes, any one or more of the various aspects, embodiments, and/or their equivalents, may be extended to applications including more than two respective operational modes. When phase related information is employed in accordance with these different distinct operational modes, adaptation and selectivity among the respective operational modes may be made by converting that phase related information from any one of the operational modes to one or more other of the respective operational modes.

As may be understood, when phase related information for EGBF is available, that phase related information may be reused for information suitable for co-phased STBC (and vice versa). Generally speaking, co-phased STBC may be viewed has having relatively more diversity gain than EGBF and having relatively more consistent performance within fading channel applications. As such, when phase-related information associated with and provided in accordance with EGBF becomes stale (e.g., after a particular period of time [which may be predetermined, fixed, adaptively determined, etc.] has passed), then that particular phase information provided in accordance with EGBF may be for co-phased STBC operation. Generally speaking, adaptation and selectivity may be applied to and used to filter the particular type of phase-related information that has been provided. For example, if phase-related information provided accordance with one of the particular operational modes is deemed as having become stale, then phase-related information provided accordance with another of the particular operational modes may be employed.

Generally speaking, if the feedback related information is fresh or not stale, then performance may be relatively better. For example, in one possible embodiment, if the feedback related information is fresh are not stale, then EGBF may be employed; alternatively, if the feedback related information is in fact stale, then co-phased STBC may be employed. Such adaptive selection between different respective types of operational modes may be made as a function of the freshness or rescind this of the phase-related information (e.g., such as being categorized as being either stale or not stale based on the comparison of the time such information was derived to the current time and a staleness threshold that indicates, for example, that the information is "too old" to use).

As may also be understood, if phase information for co-phased STBC is available, then a particular information may be reused for EGBF with additional information for the phase difference between the first and the second transmit antennas (e.g., d1).

In addition, when considering operation accordance with the codebook design (e.g., LTE), as long as the codebook operates using phase information, that phase related information may be converted for use within other operational modes. For example, if phase related information is provided accordance with the codebook design, then it may be converted for use within co-phased STBC as well.

Moreover, it is noted that adaptation between different respective operational modes may be made. That is to say, at or during a first time or period, operation may be performed in accordance with a first of the operational modes. At or during a second time or period, operation may be performed in accordance with a second of the operational modes. Adaptation between two or more respective operational modes may be made at or during different respective times or periods. The criteria or criteria on employed for driving such selectivity in adaptation between the different respective operational modes may be varied (e.g., based upon one or more local operating conditions or operating conditions, one or more channel conditions, one or more historical bases corresponding to local and/or remote operating conditions, etc.).

Figure 9:
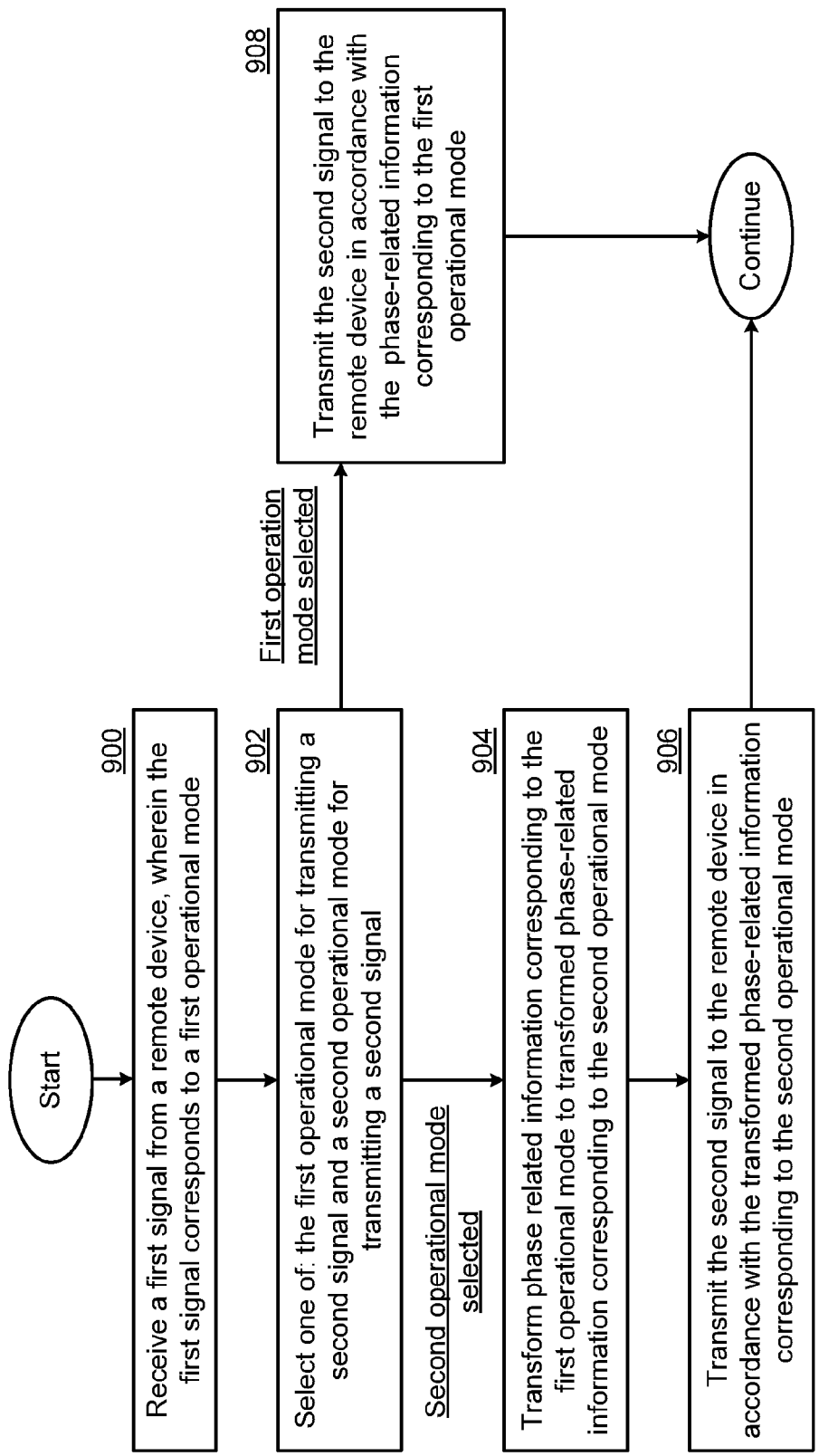
FIG. 9 illustrates an embodiment of a method adaptation between operational modes.

FIG. 9 illustrates an embodiment of a method adaptation between operational modes. In particular, a method is described for use in conjunction with a communication device including one or more of the functions and features described in conjunction with FIGS. 1-8. In step 900, a first signal is received from a remote device, wherein the first signal corresponds to a first operational mode. Step 902 includes selecting one of: the first operational mode for transmitting a second signal and a second operational mode for transmitting the second signal. When the second operational mode is selected for transmitting the second signal, the method proceeds to transform phase-related information corresponding to the first operational mode to transformed phase-related information corresponding to the second operational mode as shown in step 904. Step 906 includes transmitting the second signal to the remote device in accordance with the transformed phase-related information corresponding to the second operational mode. When the first operational mode is selected for transmitting the second signal, the method proceeds to transmit the second signal to the remote device in accordance with the phase-related information corresponding to the first operational mode as shown in step 908.

In an embodiment, step 902 is based on a measure of staleness of the phase-related information corresponding to the first operational mode. For example, the first operational mode can be a space-time block coding transmission scheme and the second operational mode can be a beamforming transmission scheme. In another example, the second operational mode can be a space-time block coding transmission scheme and the first operational mode can be a beamforming transmission scheme.

Figure 10:
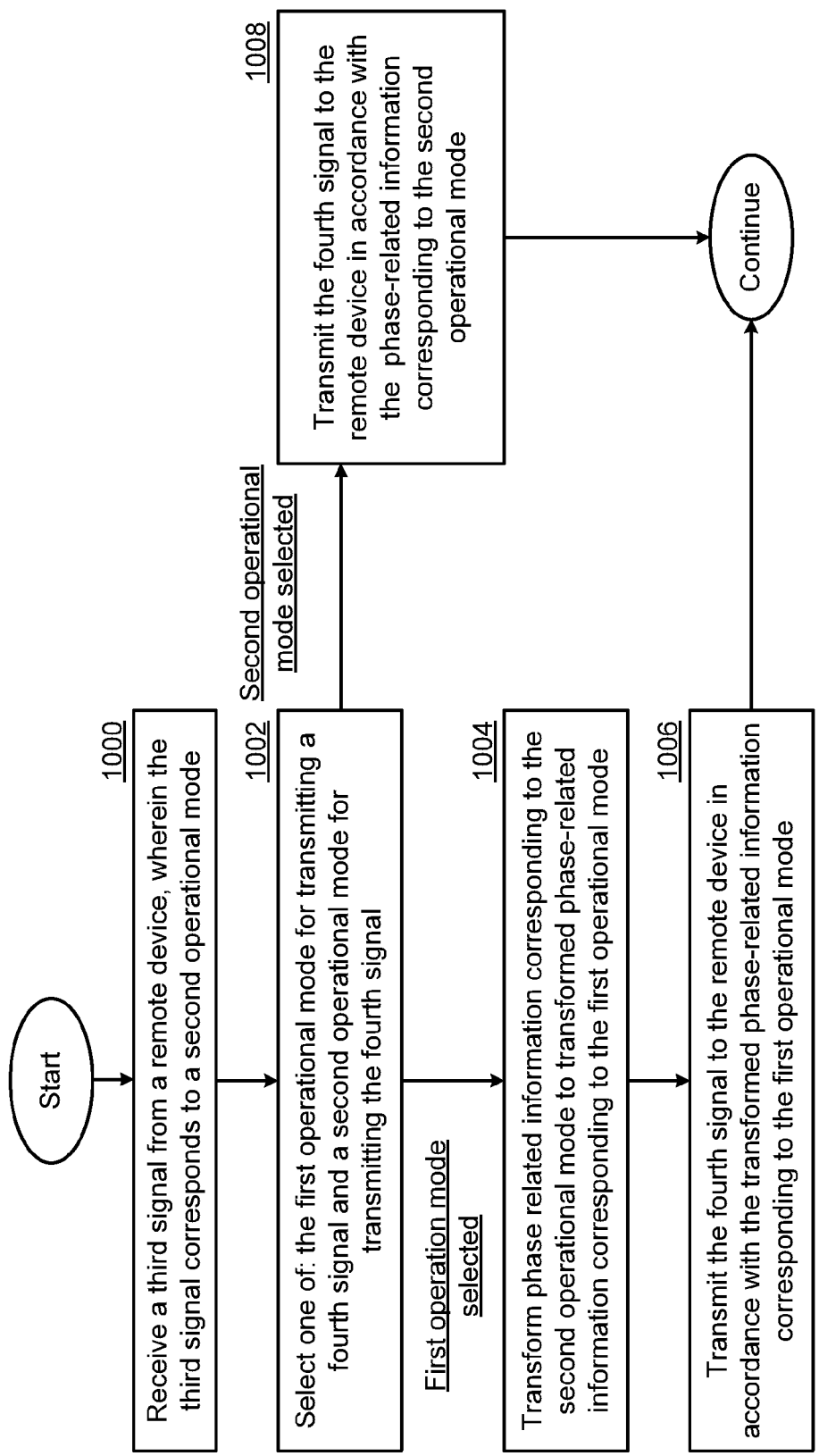
FIG. 10 illustrates an embodiment of a method adaptation between operational modes.

FIG. 10 illustrates an embodiment of a method adaptation between operational modes. In particular, a method is described for use in conjunction with a communication device including one or more of the functions and features described in conjunction with FIGS. 1-9. In step 1000, a third signal is received from a remote device, wherein the third signal corresponds to a second operational mode. Step 1002 includes selecting one of: the first operational mode for transmitting a fourth signal and a second operational mode for transmitting the fourth signal. When the first operational mode is selected for transmitting the second signal, the method proceeds to transform phase-related information corresponding to the second operational mode to transformed phase-related information corresponding to the first operational mode as shown in step 1004. Step 1006 includes transmitting the fourth signal to the remote device in accordance with the transformed phase-related information corresponding to the first operational mode. When the second operational mode is selected for transmitting the fourth signal, the method proceeds to transmit the fourth signal to the remote device in accordance with the phase-related information corresponding to the second operational mode as shown in step 1008.

It is also noted that the various operations and functions as described with respect to various methods herein may be performed within a wireless communication device, such as using a baseband processing module and/or a processing module implemented therein, (e.g., such as in accordance with the baseband processing module 64 and/or the processing module 50 as described with reference to FIG. 2) and/or other components therein including one of more baseband processing modules, one or more media access control (MAC) layers, one or more physical layers (PHYs), and/or other components, etc. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennas to another wireless communication device (e.g., which also may include at least one of any number of radios and at least one of any number of antennas) in accordance with various aspects, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above and in the claims with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A communication device, comprising:
a plurality of antennas to receive a first signal from a remote device, in accordance with a first operational mode that corresponds to a first transmission scheme;
a baseband processor that selects one of: the first operational mode for transmitting a second signal in accordance with the first transmission scheme and a second operational mode for transmitting the second signal in accordance with a second transmission scheme that differs from the first transmission scheme;
wherein, when the second operational mode is selected for transmitting the second signal:
the baseband processor transforms antenna phase-related information corresponding to the first operational mode to transformed antenna phase-related information corresponding to the second operational mode, wherein the antenna phase-related information is one of: angle information between at least two of the plurality of antennas or phase information between at least two of the plurality of antennas; and
the at least two of the plurality of antennas transmit the second signal to the remote device in accordance with the transformed antenna phase-related information corresponding to the second operational mode.

2. The communication device of claim 1, wherein:
the baseband processor selects one of: the first operational mode for transmitting the second signal and the second operational mode for transmitting the second signal, based on a measure of staleness of the antenna phase-related information corresponding to the first operational mode.

3. The communication device of claim 1, wherein:
the first operational mode is a space-time block coding transmission scheme and the second operational mode is a beamforming transmission scheme.

4. The communication device of claim 1, wherein:
the second operational mode is a space-time block coding transmission scheme and the first operational mode is a beamforming transmission scheme.

5. The communication device of claim 1, wherein, when the first operational mode is selected for transmitting the second signal:
the plurality of antennas transmit the second signal to the remote device in accordance with the antenna phase-related information corresponding to the first operational mode.

6. The communication device of claim 1 wherein:
the plurality of antennas receive a third signal from the remote device, wherein the third signal is received accordance with to the second operational mode;
the baseband processor that selects one of: the first operational mode for transmitting a fourth signal and a second operational mode for transmitting the fourth signal;
wherein, when the first operational mode is selected for transmitting the fourth signal:
the baseband processor transforms antenna phase-related information corresponding to the second operational mode to transformed antenna phase-related information corresponding to the first operational mode; and
the at least one of the plurality of antennas transmit the fourth signal to the remote device in accordance with the transformed antenna phase-related information corresponding to the first operational mode.

7. The communication device of claim 1, wherein:
the communication device is an access point (AP); and
the remote device is a wireless station (STA).

8. The communication device of claim 1, wherein:
the remote device is an access point (AP); and
the communication device is a wireless station (STA).

9. A method for use in a communication device, the method comprising:
receiving a first signal from a remote device via at least two antennas, wherein the first signal is received in accordance with a first operational mode that corresponds to a first transmission scheme;
selecting one of: the first operational mode for transmitting a second signal and a second operational mode that corresponds to a second transmission scheme for transmitting the second signal, based on a measure of staleness of antenna phase-related information corresponding to the first operational mode that includes a phase difference between the at least two antennas;
when the second operational mode is selected for transmitting the second signal:
transforming the antenna phase-related information corresponding to the first operational mode to transformed antenna phase-related information corresponding to the second operational mode; and
transmitting the second signal to the remote device in accordance with the transformed antenna phase-related information corresponding to the second operational mode.

10. The method of claim 9, wherein:
the first operational mode is a space-time block coding transmission scheme and the second operational mode is a beamforming transmission scheme.

11. The method of claim 9, wherein:
the second operational mode is a space-time block coding transmission scheme and the first operational mode is a beamforming transmission scheme.

12. The method of claim 9, wherein, the method further comprises:
when the first operational mode is selected for transmitting the second signal:
transmitting the second signal to the remote device in accordance with the antenna phase-related information corresponding to the first operational mode.

13. The method of claim 9, further comprising:
receiving a third signal from the remote device, wherein the third signal corresponds to the second operational mode;
selecting one of: the first operational mode for transmitting a fourth signal and a second operational mode for transmitting the fourth signal;
wherein, when the first operational mode is selected for transmitting the fourth signal:
transforming the antenna phase-related information corresponding to the second operational mode to transformed phase-related information corresponding to the first operational mode; and
transmitting the fourth signal to the remote device in accordance with the transformed antenna phase-related information corresponding to the first operational mode.

14. The method of claim 9, wherein:
the communication device is an access point (AP); and
the remote device is a wireless station (STA).

15. The method of claim 9, wherein:
the remote device is an access point (AP); and
the communication device is a wireless station (STA).

16. The method of claim 9, wherein:
the communication device is a base station; and
the remote device is a mobile communication device.

17. A communication device, comprising:
at least one radio frequency section that receives a first signal from a remote device via a plurality of antennas, wherein the first signal is received in accordance with a first operational mode that corresponds to one of: a space-time block coding transmission scheme or a beamforming transmission scheme;
a baseband processor that selects one of: the first operational mode for transmitting a second signal and a second operational mode for transmitting the second signal, wherein the second operation mode corresponds to one of: a space-time block coding transmission scheme or a beamforming transmission scheme, that differs from the first operational mode;
wherein, when the second operational mode is selected for transmitting the second signal:
the baseband processor transforms antenna phase-related information corresponding to the first operational mode that includes a phase difference between at least two of the plurality of antennas to transformed antenna phase-related information corresponding to the second operational mode; and
the at least one radio frequency section transmits the second signal to the remote device via the plurality of antennas in accordance with the transformed antenna phase-related information corresponding to the second operational mode.

18. The communication device of claim 17, wherein:
the baseband processor selects one of: the first operational mode for transmitting the second signal and the second operational mode for transmitting the second signal, based on a measure of staleness of the antenna phase-related information corresponding to the first operational mode.

19. The communication device of claim 17, wherein:
the communication device is an access point (AP); and
the remote device is a wireless station (STA).

20. The communication device of claim 17, wherein:
the remote device is an access point (AP); and
the communication device is a wireless station (STA).

* * * * *